United States Patent

Coonan

[15] 3,653,251
[45] Apr. 4, 1972

[54] PIPE BENDING
[72] Inventor: Paul Valentine Coonan, Preston, England
[73] Assignee: British Aircraft Corporation Limited, London, England
[22] Filed: Feb. 17, 1970
[21] Appl. No.: 11,993

[30] Foreign Application Priority Data

Feb. 28, 1969 Great Britain ................. 10,902/69

[52] U.S. Cl. .................................. 72/369, 72/7, 72/702
[51] Int. Cl. ................................. B21d 7/12, B21d 7/14
[58] Field of Search .......................... 72/7, 307, 369, 702

[56] References Cited

UNITED STATES PATENTS

| | | | |
|---|---|---|---|
| 2,382,745 | 8/1945 | Powers | 72/7 |
| 3,116,779 | 1/1964 | Procter et al. | 72/369 |
| 3,145,756 | 8/1964 | Hill | 72/7 |
| 3,156,287 | 11/1964 | Munro | 72/702 |

Primary Examiner—Lowell A. Larson
Attorney—Sughrue, Rothwell, Mion, Zinn and Macpeak

[57] ABSTRACT

Producing replicas of a sample pipe using a numerically controlled pipe bending machine, by deriving a Programme for the machine from the sample pipe, modifying the Programme in accordance with measurement of a test bend of pipe material, and bending pipe material on the machine in accordance with the modified Programme.

5 Claims, 2 Drawing Figures

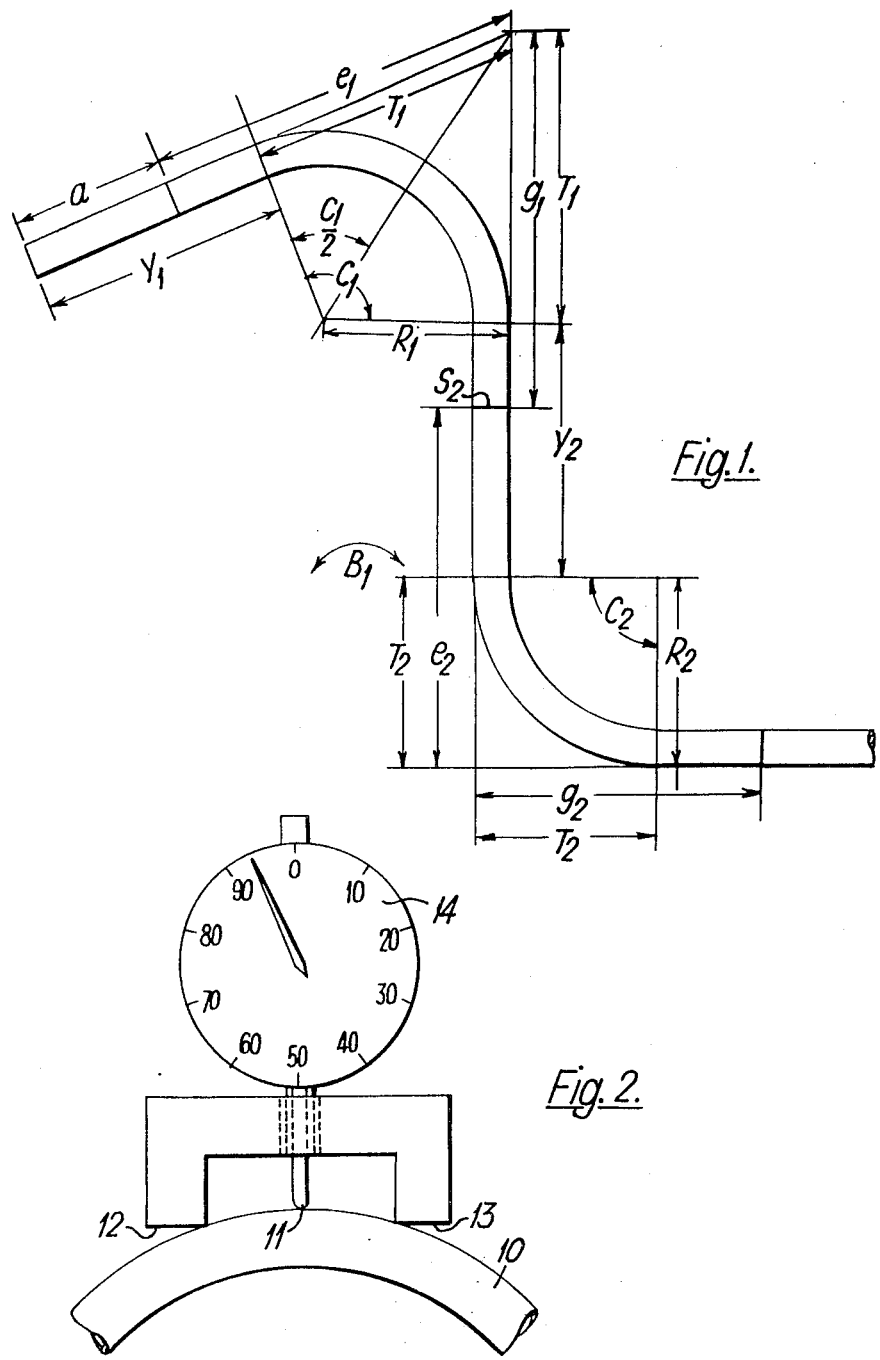

PIPE BENDING

This invention relates to pipe bending and is particularly concerned with the production of accurate replicas of a sample having a number of bends along its length. After pipe material has been bent through a given angle around a former of given radius, it tends to springback to some extent so that the actual angle and radius of bend produced differ from the given values. These differences vary according to the pipe material used, and even vary between different batches of the same material and between specimens of the same batch bent at different temperatures.

Numerically controlled pipe bending machines are known, which can be programmed to produce a series of similar replicas of a bent pipe sample from a given batch of pipe material, but a fresh program must be prepared for each fresh batch of material, and the production of the programs is time-consuming and expensive business if the replicas are to be accurate. Although the machine may be equipped with known means for sensing and imparting the required degree of "overbend" to compensate for "spring-back" and hence ensure that the bend angles are correct, the variations in bend radius with different material or temperature cause further difficulty, because they involve variations in the distance between the start and finish of each bend, and hence variations in the overall dimensions of the finished pipe. For this reason, the production of a program which will produce accurate replicas in a new batch of material has hitherto involved a lengthy process of making copies by trial and error. When a different batch of material, of different "spring-back" characteristics is used, it is necessary to repeat the process so as to derive a new program suited to the new batch of material.

According to the present invention, pipes are produced, to conform with a given sample pipe, using a numerically controlled pipe bending machine, by a method comprising the steps of: giving a test bend of specified nominal angle and radius to a specimen of the pipe material on the machine, measuring the radius of the actual test bend produced, deriving from the given sample pipe a fundmental program for the machine in terms of a series of straight pipe portions of specified lengths angularly joined at specified angles, modifying the fundamental program in accordance with the measured radius of the test bend, and thereafter bending pipe material on the machine using the modified program.

When using a fully automatic machine with means for compensation for "spring-back," the fundamental program may simply be modified by reducing the specified lengths of straight pipe to the extent necessary to mate up with the start and finish of each of the bends which will replace the angular joins of the fundamental program having regard to the measured radius of the test bend.

The radius of the actual bend produced in the test specimen is preferably measured on the outside of the bend. This can be done quite simply with an instrument having two fixed feet and a movable foot midway between them, spring-loaded to the position in which the three feet are aligned a geared-up dial gauge being provided to measure any departure of the movable foot from the aligned position. When this instrument is applied to the outside of a pipe bend, the dial reading is a measure of the outside radius of the bend. Tables can readily be compiled for converting the dial reading into modification values to be incorporated in the fundamental program.

With this method, it is no longer necessary for the manufacturer to keep the original sample once the fundamental program has been derived from it. His requirements, for immediate production or at a future date for replacements, can readily be met by measuring the test bend in one specimen of the available batch of material, modifying the fundamental program according to the result of the test, and then bending the pipe material on the machine in accordance with the modified program. It is no longer necessary to make a fresh copy or copies each time a fresh batch of material is used or the conditions of working change. Continuity of production, stock-keeping, and the supply of spare parts are thus all simplified.

A particular example of a method in accordance with the invention will now be described, with reference to the accompanying drawings, in which FIG. 1 shows a section of pipe; and FIG. 2 is a diagrammatic elevation, with parts in section, of a gauge for measuring bend radius.

This particular method has been devised to suit an existing type of automatic numerically controlled pipe bending machine. This is the "Datex PTB–101 Numerically Controlled Tube Bender," made by Datex Corporation of Monrovia, California, United States of American. In use, the machine is first adjusted to deal with pipes of the appropriate external diameter. The input data required for the machine are:

| | |
|---|---|
| $Y_1, Y_2 \ldots Y_n, Y_{finish}$ | = distances between the start of the pipe and the beginning of the first bend, then between the finish of each bend and the start of the next bend, and finally between the finish of the last bend and the finish of the pipe. |
| $C_1, C_2 \ldots C_n$ | = angle of each bend. |
| $B_1, B_2, \ldots B_{n-1}$ | = twist angles between each bend and the next, i.e., the angle between the plane of one bend and the plane of the next succeeding bend. |

A sample pipe is made up by hand accurately to suit the particular application, such as a pipe run in an aircraft. The sample pipe consists of a number of straight sections of different lengths Y, joined by bends, all of which are of substantially equal radius but which may differ widely in the angle C through which the pipe is bent; also the plane of one bend may be at an angle B (the twist angle) to the plane of the next bend.

The sample pipe is then accurately measured. For this purpose, each straight portion is circumferentially scribed at an arbitrary point $S_1$, $S_2$, near its mid-length to provide a datum point. The distances $e$, $g$, from the scribe marks on adjacent straight portions to the point of intersection of lines prolonging the exterior of the straight portions in the plane of the bend on the outside of the bend are measured, directly or indirectly, and the angle C between the perpendiculars to these straight portions is also measured. There measurements are repeated along the whole length of the pipe, and the distances $a$, $b$, from the start and finish of the pipe, to the scribe marks on the first and last straight sections, respectively, are also measured. Measurements are also made of the twist angles B.

A convenient indirect method of measuring $e_1$ is to measure $f_1$, from the outside of the second straight, to the outside of the scribe mark $S_1$ on the first straight, in a direction perpendicular to the second straight, and then calculate $e_1$ from the relation $e_1 = f_1 \operatorname{cosec} C_1$. Likewise $g_1$ may be calculated from measurement of $d_1$.

The full set of measurements defines the pipe in terms of a series of straight pipes of specified lengths $(a+e_1), (g_1+e_2) \ldots (g_n \ 30 \ b)$ angularly joined at specified angles $C_1 \ldots C_n$, without bends, the angles lying in planes inclined to one another at the twist angles $B_1 \ldots B_{n-1}$.

A program for the pipe bending machine is derived from this set of measurements and constitutes the fundamental program mentioned above. Modification is necessary to introduce the necessary bends before pipes can be bent to this program.

This modification consists in reducing the lengths of the straight portions specified in the fundamental program from the distances $(a+e_1), (g_1+e_2)$ etc. referred to above to the correct values $Y_1, Y_2$ etc. which depend upon the actual, rather than the nominal, radius of curvature of each bend.

If we use $T_1$ to represent the (equal) distances from the start and finish of the first bend to the intersection of the prolongations of the exteriors of the adjacent straight portions, and R for the actual measured external radius of the bend.

$T_1 = R \tan (C_1/2)$

The correct value of $Y_1$ can now readily be calculated.

$Y_1 \ 32 \ a+(e_1-T_1) \ 17$
$= a+e_1 - R \tan (C_1 2)$

Similarly $$Y_2 = (g_1 - T_1) + (e_2 - T_2)$$
$$= g_1 - R \tan(C_1/2) + e_2 - R \tan(C_2/2)$$

It is also necessary to provide the required degree of "over-bend" so that when the pipe has sprung back the angles C will be correct. The Datex PTB – 101 machine concerned incorporates known means for sensing and imparting the necessary "over-bend."

Thus the only information necessary for modification of the fundamental program to incorporate the correct values $Y_1$, $Y_2$ etc. is the value of R, and it has been found that this can be obtained with sufficient accuracy by making one test bend on a test specimen of the batch of material to be used. The test bend is made to a specified nominal angle (say 90°) and the same nominal radius as the radius of the bends in the sample bent pipe and the actual radius R of the outer periphery of the bend is measured, using the dial gauge instrument illustrated in FIG. 2. This instrument is placed on the outside of the test bend 10, and the departure of its movable spring-loaded foot 11 from alignment with its fixed feet 12, 13 is measured on the geared-up dial gauge 14, which is calibrated in terms of the corresponding bend radius.

From this measurement it is possible to calculate as indicated above the necessary modifications of the fundamental program for reducing the distances $(a + e_1)$, $(g_1 + e_2)$ etc. to the correct lengths $Y_1$, $Y_2$ etc. In practice, tables giving the appropriate modification are supplied to the operator of the machine. Pipes can then be bent to the modified program which will accurately reproduce the original sample.

The invention is also applicable to other types of automatic pipe bending machine, which lack the means for deducing and imparting the necessary "over-bend." One such machine is the "Pines tube bender" made by Pines Engineering Co. Inc. of Aurora, Illinois, United States of America. In such cases it is necessary to make two test bends on specimens of the batch of material on the machine, e.g., one of 20° and the other of 120° nominal angle, and from measurements of the actual angles produced to calculate the constant and proportional "spring-back" values. These values have to be taken into account on the machine in the setting for each bend.

A semi-automatic machine, the "Fairey Tube Bender," made by Fairey S.A. of Gosselies, Belgium, in addition to the data listed above for the automatic machine, requires data on the length of pipe to be used in the making of each bend. The relationship between the length of the arc of finished pipe and the length of starting material is known from experiment and is scarcely affected by changes in material. Hence the length of pipe to be used in each bend can be calculated and incorporated in the modified program, when the outside radius of the usual test bend has been measured on the dial gauge. In practice, tables are provided for the operator showing the bend length for given bend angles for a specified dial gauge reading.

In carrying out the present invention, a test bend is made for each fresh batch of material, but while the batch lasts it is only necessary to make periodic checks on the accuracy of the pipes being produced. Of course, it the pipes become inaccurate, further modification of the program is necessary and a further test bend will be made to determine the correct values for this modification.

I claim:

1. A method of producing pipes, to conform with a given sample pipe, using a numerically controlled pipe bending machine, comprising the steps of: giving a test bend of specified nominal angle and radius to a specimen of the pipe material on the machine, measuring the radius of the actual test bend produced, deriving from the given sample pipe a fundamental programme for the machine in terms of a series of straight pipe portions of specified lengths angularly joined at specified angles, modifying the fundamental programme in accordance with the measured radius of the test bend, and thereafter bending pipe material on the machine using the modified programme.

2. A method of producing pipes according to claim 1, wherein the fundamental programme is modified by reducing the specified lengths of straight pipe portions to the extent necessary to mate up with the start and finish of each of the bends which will replace the angular joins of the fundamental programme, having regard to the measured radius of the test bend.

3. A method of producing pipes according to claim 1, wherein the radius of the actual test bend is measured on the outside of the bend.

4. A method of producing pipes according to claim 3, wherein the radius is measured by means of an instrument having two fixed feet and a movable foot midway between them, spring-loaded to the position in which the three feet are aligned, a geared-up dial gauge being provided to measure departure of the movable foot from the aligned position.

5. A method of producing pipes according to claim 1, wherein the fundamental programme is further modified to compensate for "spring-back," on the basis of measurements of the actual angles produced in two test bends of different nominal angles.

* * * * *